Sept. 26, 1961   B. LONG   3,001,329
PROCESS OF MANUFACTURING HOLLOW GLASS BODIES
Filed July 21, 1958   3 Sheets-Sheet 1

INVENTOR.
BERNARD LONG
BY Richards & Geier
ATTORNEYS

INVENTOR.
BERNARD LONG
BY
Richards & Geier
ATTORNEYS

Sept. 26, 1961

B. LONG 3,001,329

PROCESS OF MANUFACTURING HOLLOW GLASS BODIES

Filed July 21, 1958

INVENTOR.
BERNARD LONG
BY
Richards & Geier
ATTORNEYS

United States Patent Office 3,001,329
Patented Sept. 26, 1961

3,001,329
PROCESS OF MANUFACTURING HOLLOW GLASS BODIES
Bernard Long, Paris, France, assignor to Glaces de Boussois, Paris, France, a corporation of France
Filed July 21, 1958, Ser. No. 749,669
Claims priority, application France July 30, 1957
3 Claims. (Cl. 49—83)

This invention relates to methods of increasing the mechanical strength of hollow glass bodies, and refers more particularly to methods pertaining to glass bodies obtained by the so-called "press-and-blow" and "blow-and-blow" methods.

The invention is particularly concerned with methods pertaining to light weight hollow bodies, such as bottles, jars, beakers, etc., and, consequently, includes recently marketed hollow bodies of small thickness which, due to a substantially constant distribution of thickness, have a considerably lower weight than those of similar type previously produced, while retaining appropriate mechanical strength.

An object of the present invention is the provision of methods of considerably increasing the mechanical strength of hollow bodies, particularly the impact resistance and the resistance to internal pressure.

Another object is the provision of a process of this type which is particularly applicable to thin-walled hollow bodies, the mechanical strength of which is, as is well known, increased only slightly by tempering.

Other objects of the present invention will become apparent in the course of the following specification.

The process according to the invention includes the steps of bringing the wall of the hollow body to a temperature at which the viscosity of the glass is below $10^9$ poises, then cooling the glass of this wall in order to produce a continuous and considerable reduction in the viscosity thereof from the external surface to the internal surface, while maintaining its mean value between about $10^9$ and $10^{12}$ poises, thereafter rapidly deforming the wall towards the outside by subjecting its internal surface to the action of a hot gas under pressure and at a temperature equal to or higher than that of this surface, and finally rapidly solidifying the wall in the very early stage of its viscous deformation under the action of the internal pressure, this rapid solidification progressing throughout the thickness from the external surface to the internal surface.

When the mean value of its viscosity is fixed as being between $10^9$ and $10^{12}$ poises, the glass of the wall is in a zone in which the temperature coefficient of the viscosity is a maximum. It is known in prior art from recent studies relating to the viscosity of glasses, that the variation of the viscosity as a function of temperature—which is relatively slow for viscosities below about $10^8$ poises and is also slow for viscosities above about $10^{13}$ poises—is much more rapid between these two values. Consequently, by providing for the mean value of the viscosity of the wall a value located in the range of from $10^9$ to $10^{12}$ poises, the process acocrding to the invention provides the possibility of obtaining, with a given temperature difference between the external surface and the internal surface, a large viscosity difference between the external and internal surface layers and, consequently, a large difference between the rates of viscous deformation of these layers under the action of an increased pressure within the hollow body.

It is well known that various industrial glasses employed in the manufacture of hollow bodies do not possess the same viscosity values at the same temperatures.

To provide an example, it may be stated that in a group of currently used soda-lime glasses, temperatures corresponding to a viscosity of $10^9$ poises range approximately between 620° C. and 670° C. according to the composition of glass, while temperatures corresponding to a viscosity of $10^{12}$ poises are approximately between 550° C. and 600° C.

It should be noted that, when pressure on the internal surface of the wall of the hollow body is suddenly increased under the conditions of the above-described process, an instantaneous elastic deformation takes place first and that the purely viscous deformation exists alone only after the disappearance of the delayed elastic deformation, which is superposed thereon for actually a very short time.

A feature of the process of the present invention is that the gas under pressure which acts on the internal surface of the wall, has a temperature which is equal to or higher than that of this surface. This is an important point, since if the gas cools the internal surface of the wall the maximum temperature would unavoidably exist at a distance from this wall, such distance increasing in proportion to the cooling. Consequently, there would be formed within the thickness of the wall, after its rapid solidification, a glass layer in tension which would weaken its total mechanical strength.

The process according to the invention is basically characterized in that it produces a continuous and considerable reduction of the speed of viscous flow at the various points of the wall from the internal surface to the external surface. In other words, the process produces in the wall a high gradient of speed of viscous flow which has the same direction throughout.

In the course of the viscous deformation, the entire wall is subjected to tensile stress in a tangential direction, i.e. parallel to the two surfaces by which it is bounded, the stresses being higher in proportion as the gradient of speed of viscous flow is higher.

When the rapid solidification takes place, this state of stress in the plastic state is replaced by a state of stress in the opposite direction. This reversal of the stresses is only a particular case of a general phenomenon well known to glass technicians. Consequently, after solidification, the wall is in a state of permanent tangential compression throughout its thickness at room temperature. This is a remarkable result of the process of the present invention.

It will be readily noted that the relaxation in the course of the cooling is smaller when the speed of cooling increases. Consequently, under otherwise equal conditions, the final stresses are higher in proportion as the speed of cooling in the course of the solidification is greater.

The degree of tangential compression of the wall depends, therefore, essentially upon the following two factors:

(a) The viscosity gradient in the thickness of the wall during the viscous deformation;

(b) The speed of solidification of the wall.

As is hereinafter indicated, in carrying out the process of the present invention an attempt is made to enhance these two factors.

It is important to draw attention to the fact that the rapid solidification of the wall in the third stage of the process according to the invention should not in any way be confused with tempering.

In this connection, it will be remembered that tempering is based on the following two conditions:

(a) Before being subjected to rapid cooling, the article to be tempered has the same temperature throughout its thickness or, if temperature uniformity has not been completely established, the surface layers of the article are slightly overheated.

(b) The rapid cooling is simultaneously and symmetrically applied to the two faces of the article.

Neither of these two conditions is fulfilled in the process according to the invention.

In addition, a third distinctive feature must be emphasized:

In the process of the present invention, the rapid solidification of the wall of the hollow body takes place while it is under heavy tension at all its points under the action of the increased pressure exerted on its internal surface. Apart from gravity, which is of negligible extent, no force of external origin takes effect in the tempering.

The present invention also includes the devices for carrying the above processes into effect regarding which some general observations will be made. Three of these devices will be described in detail hereinafter.

The process according to the invention is applicable to a hollow glass body which has been given a temporary external form similar to its final form by a shaping effected by means of a machine or by manual working.

It is in the course of the application of the process that this temporary form becomes final, the transformation being effected by rapidly blowing up and then rapidly solidifying the wall of the hollow body while it conforms to the thermal conditions hereinbefore indicated in the description of the process of the present invention.

In order to give the wall of the hollow body in its temporary form a mean viscosity between $10^9$ and $10^{12}$ poises, it is first heated, preferably by radiation, in such manner that its mean viscosity is below $10^9$ poises. The solid body is thereafter transferred into a metal mould, the inner surface of which has a high reflection factor, (i.e. a low absorption factor) for the thermal radiation of the hollow body. In this mould, the thermal conditioning of the wall is completed, whereupon the final shaping is effected by rapid inflation and solidification of the wall.

The wall of the mould is provided with a large number of passages of small diameter through which a gaseous fluid can be blown; it is also traversed by channels or passages serving to discharge the gaseous fluid to the outside when it has encountered the wall of the hollow body.

The hollow body is located at a short distance from the mould surrounding it, this arrangement being necessary in order to make it possible to change the temporary form to the final form by means of a slight inflation.

The thermal conditioning of the wall consists in:

(1) Bringing the mean value of the viscosity to a range from $10^9$ to $10^{12}$ poises, and (2) Creating a considerable viscosity difference, i.e., a considerable temperature difference between the outer surface and the inner surface.

It should be noted that the hollow body loses heat by radiation and by convection during its transfer from the heating vessel into the mould, and it is easy to satisfy the first of the above conditions simply by blowing upon the outer surface of the wall, because the heat loss due to radiation within the mould is rendered negligible by the high reflection factor of its wall. This cooling by convection creates at the same time the considerable temperature difference mentioned hereinabove.

As soon as the blowing on the outer surface has been completed, the sudden increase in pressure within the hollow body is initiated, and there is set up in the wall the high gradient of speed of flow hereinbefore mentioned, whereupon the wall is applied against the metal mould which, while imparting its final external contour thereto, actively cools it by conduction. After rapid solidification, the wall is in tangential compression throughout its thickness.

The distance which must be maintained between the external surface of the temporary form and the mould is adjusted as a function of the thickness of the wall, of the admissible pressure increase within the hollow body and of the fact that the hollow body undergoes an instantaneous elastic deformation followed by a delayed elastic deformation, which is combined with the viscous deformation.

This adjustment also depends upon the composition of the glass.

The rapid solidification is capable of the following modifications:

Instead of vigorously cooling the external surface of the hollow body by contact with the wall of the mould, it is possible to cool it by convection, namely, by starting the blowing by the engagement of the wall of the hollow body with a sensing member when the viscous deformation has progressed to an appropriate amount; the movement of the sensing member closes, through an appropriate contactor, the circuits of two electromagnetic valves controlling the admission of blowing air.

After its rapid solidification, the wall of the hollow body obviously must not undergo any annealing treatment, since this would reduce its mechanical strength.

In order to avoid the creation of a dangerous zone, it is desirable, on the other hand, to subject the glass surrounding the opening of the hollow body to a thermal annealing treatment of variable extent, which does not affect the wall.

The increase in the mechanical strength imparted to the hollow body by the process according to the invention, obviously is caused by the fact that the wall is brought into tangential compression throughout its thickness. By way of example, the process of the present invention makes it possible to increase the resistance to internal pressure to more than twice the value normally observed after annealing, and to increase the resistance to impact on the external surface to three times the usual value, this being applicable to hollow bodies having a mean wall thickness of a few millimetres.

The invention will appear more clearly from the following detailed description, when taken in connection with the accompanying drawings showing, by way of example only, preferred embodiments of the inventive idea.

Figure 1:
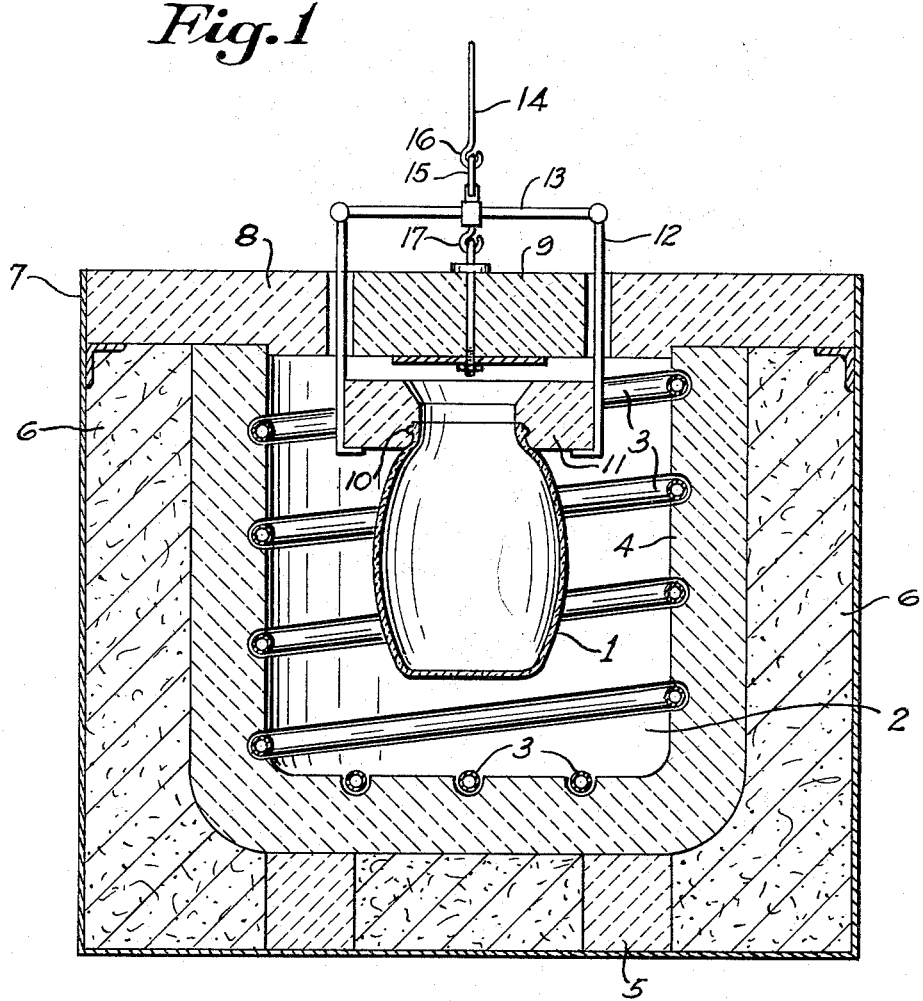
FIGURE 1 shows in vertical section a jar having a temporary external form and located in a radiation heating chamber.

FIGURE 1 shows a jar 1 which has been given its temporary form by the well known "press-and-blow" method, and which is heated within a chamber 2 by radiation from resistors 3 disposed within recesses formed in the wall of a cylindrical member 4 consisting of refractory material.

The member 4 is supported by insulating bricks 5, the thermal insulation being effected by the insulating material 6 consisting of kieselguhr, asbestos wad, or the like, and located in a metal casing 7. The chamber 2 is closed by the fixed cover 8 and by a movable cover 9 of light refractory material.

The jar 1 is held in position by its flange 10 within a ring mould 11, which rests on arms 12. The arms 12 are pivotally connected to the ends of a horizontal rod 13 suspended by means of a ring 15 on a hook 16 of a fixed metal rod 14. The movable cover 9, which prevents loss of heat upwards from the jar, is suspended from a hook 17.

The heating of the jar 1 in the chamber 2 to a temperature at which the viscosity of the glass is below $10^9$ poises is rapidly effected by reason of the fact that the jar has retained heat. Since the glass is heated mainly by radiation, the temperature differences in the thickness of the wall are small.

Figure 2:
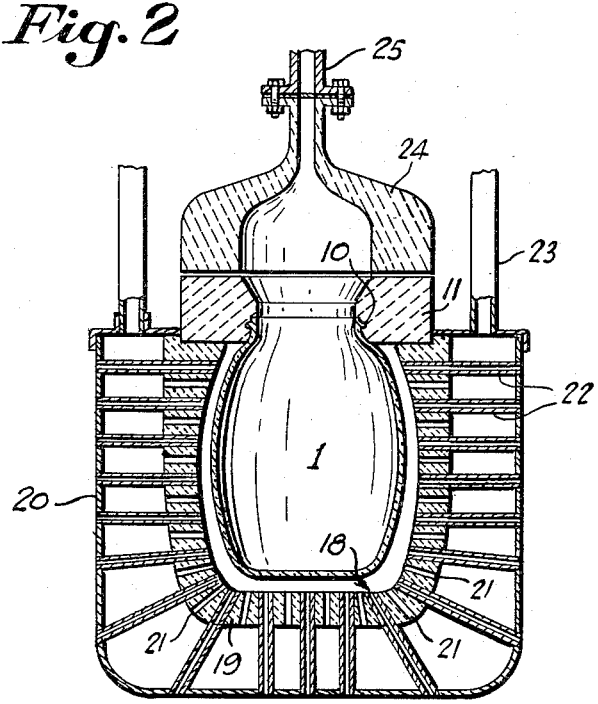
FIGURE 2 shows in vertical section a mould for the thermal conditioning and rapid solidification before the application of the pressure increase within the jar.

The jar 1 is then placed into a mould 18 shown in FIGURE 2 which consists of a thick inner envelope 19 and a sheet metal outer envelope 20. The envelope 19 is provided with blowing passages 21 and passages 22 for the discharge of the blown gas, which extend through the outer envelope 20. The gas blown into the interior of the mould is introduced through nozzles 23. This gas is generally air.

The envelope 19 is covered on its inner surface with a lining which absorbs the radiation from the wall of the jar only to a small extent. This lining may be made of a substantially inoxidizable metal, such as gold, platinum and alloys thereof, and even of stainless steel, but it is sometimes desirable to make it of a material consisting of extremely finely divided powder having a high diffuse reflection factor, such as titanium oxide.

As has been stated in the foregoing, the thermal conditioning of the wall of the jar 1 is effected by cooling the outer surface by convection with air blown through admission pasages 21 and withdrawn through discharge passages 22.

The thermal conditioning is immediately followed by the admission of hot high-pressure gas to the interior of the jar. This is effected with the aid of the blowing head 24 and the duct 25, which is rapidly placed in communication with a hot high-pressure gas reservoir by means of an electromagnetic valve (not shown).

The rapid solidification in contact with the envelope 19 is effected while the wall of the jar 1 has, as a result of the thermal conditioning, a considerable temperature increase from the external surface to the internal surface.

In accordance with the process of the present invention, it is the outer layer which solidifies first, whereupon the solidification progresses rapidly through the thickness to the inner layer.

It must again be emphasized that this rapid solidification takes place while the various layers of the thickness of the glass body are the center of a high gradient of the speed of viscous flow under the action of the internal pressure increase.

Figure 3:
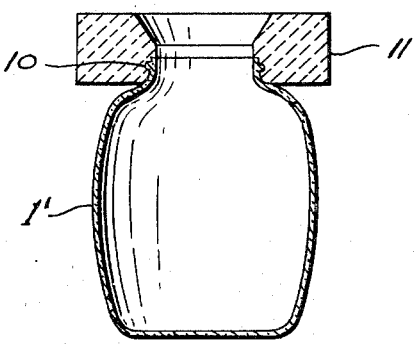
FIGURE 3 illustrates in vertical section, suspended in a ring mould, the jar of FIGURE 2 after it has attained its final external form.

In FIGURE 3, the jar which has left the mould 18 is shown at the end of the treatment. Its final wall is designated by 1'. It may be necessary to subject the flange 10 to a thermal annealing treatment after it has been removed from its mould 11. This treatment, which is well known in the art, must not affect the wall of the jar.

Figure 4:
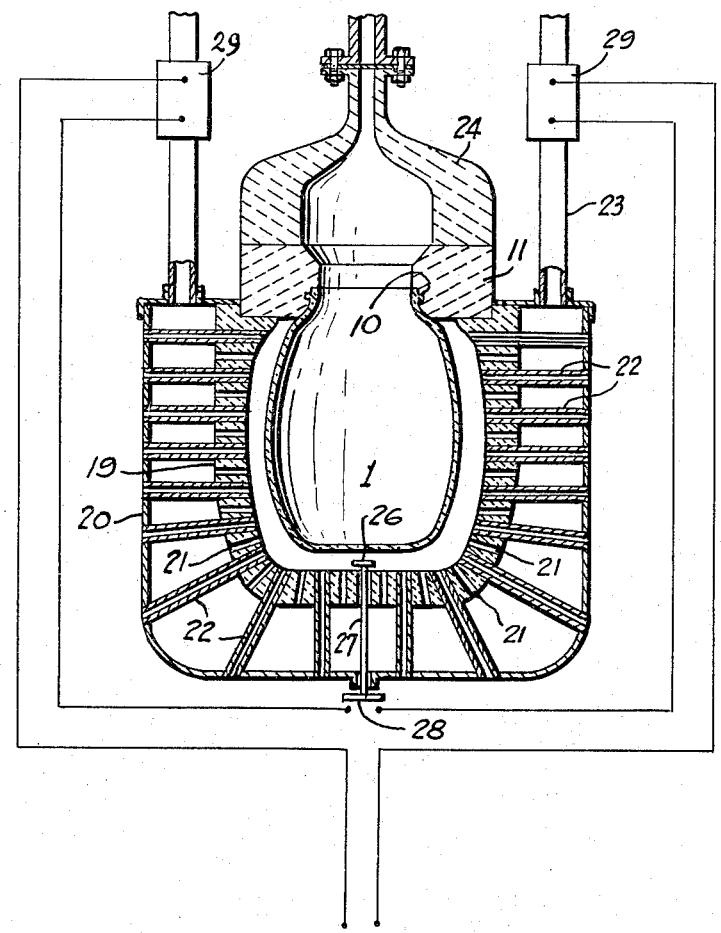
FIGURE 4 illustrates diagrammatically and partly in section a modification of the apparatus for the solidification of the final external surface of the jar by convection cooling.

FIGURE 4 shows a mould which is similar to that illustrated in FIGURE 3, similar parts being indicated by the same numerals. However, the mould shown in FIGURE 4 is used for solidfying the jar 1 by convection. For that purpose, a sensing member 26 is provided, which is moved vertically downwards when the wall of the jar 1 comes into contact therewith. A rod 27 supporting the sensing member 23 is connected with a switch 28, which closes the electric circuits of two electromagnetic valves 29 controlling the admission of blowing air into the chamber between the two envelopes 19 and 20. The solidification of the wall of the jar by convection has the advantage that it does not detrimentally affect the reflective lining of the mould.

The embodiment hereinbefore described concerns a jar, the temporary form of which is obtained by "pressing-and-blowing." It is obvious that the process of the invention may without any particular difficulty be applied to hollow bodies obtained by "blowing-and-blowing." The few adaptations which might be necessary in some cases are common in the current glass technique and are well known to those skilled in the art. Other variations and modifications may be also made within the scope of the present invention.

What is claimed is:

1. A process of manufacturing hollow bodies of untempered glass of small wall thickness and high mechanical strength, said process comprising in combination, the steps of in a first stage forming a hollow glass body and heating it by radiation in a heating chamber to a temperature at which the viscosity of the glass is below $10^9$ poises, then transferring said hollow body to a mould and cooling it therein from its external surfaces to produce a continuous reduction in the viscosity of glass from said external surfaces to the internal surfaces of said glass body while maintaining the mean value of the viscosity at from $10^9$ to $10^{12}$ poises, in a second stage subjecting said internal surfaces to a gas under pressure at a temperature at least equal to that of said internal surfaces to expand the volume of said hollow body, and in a third stage rapidly solidifying the external walls of said hollow body at an early stage of its viscous deformation caused by the internal pressure of said gas, said rapid solidification progressing throughout the thickness of said hollow body from said external surfaces to said internal surfaces thereof.

2. The process in accordance with claim 1, wherein said rapid solidification is produced by conduction.

3. The process in accordance with claim 1, wherein said rapid solidification is produced by convection.

References Cited in the file of this patent

UNITED STATES PATENTS

| | | |
|---|---|---|
| 588,926 | Owens | Aug. 24, 1897 |
| 615,910 | Rott et al. | Dec. 13, 1898 |
| 880,482 | Cox | Feb. 25, 1908 |
| 1,454,200 | Wells et al. | May 8, 1923 |
| 1,525,387 | Higgins | Feb. 3, 1925 |
| 1,592,299 | Howard | July 13, 1926 |
| 1,635,704 | Canfield | July 12, 1927 |
| 2,177,336 | Shaver et al. | Oct. 24, 1939 |
| 2,180,737 | Hess | Nov. 21, 1939 |
| 2,198,734 | Littleton | Apr. 30, 1940 |
| 2,311,846 | Littleton et al. | Feb. 23, 1943 |
| 2,313,698 | Schutz | Mar. 9, 1943 |
| 2,826,867 | Nava et al. | Mar. 18, 1958 |
| 2,837,871 | Conrad et al. | June 10, 1958 |